United States Patent [19]

Okawa et al.

[11] 4,164,605
[45] Aug. 14, 1979

[54] LAMINATED THERMAL INSULATION SHEETING

[75] Inventors: Yuuki Okawa; Sumiharu Suzuki, both of Yokohama, Japan

[73] Assignee: Tokai Metals Co., Ltd., Japan

[21] Appl. No.: 865,203

[22] Filed: Dec. 28, 1977

[30] Foreign Application Priority Data

Nov. 7, 1977 [JP]  Japan ............................. 52/149234[U]

[51] Int. Cl.$^2$ ............................................... C04B 43/02
[52] U.S. Cl. ...................................... 428/593; 428/594; 428/608; 428/920
[58] Field of Search ............... 428/593, 920, 594, 608

[56] References Cited

U.S. PATENT DOCUMENTS

| | | | |
|---|---|---|---|
| 3,345,734 | 10/1967 | Sowko | 428/608 |
| 3,371,407 | 3/1968 | Forsyth et al. | 428/608 |
| 3,615,276 | 10/1971 | Singleton | 428/608 |

*Primary Examiner*—Brooks H. Hunt
*Attorney, Agent, or Firm*—Robert E. Burns; Emmanuel J. Lobato; Bruce L. Adams

[57] ABSTRACT

A laminated thermal insulation sheeting for covering ducts and pipes wrapped up by a thermal insulator such as glass wool and rock wool, includes an aluminum sheet and a metal network disposed on and over a surface of the aluminum sheet. A substantially transparent film of synthetic resin is placed on the metal network and has portions bonded to the surface of the aluminum sheet through interstices in the metal network. The aluminum sheet comprises aluminum foil or an aluminum-metallized film of synthetic resin, and may be lined with a backing material.

8 Claims, 9 Drawing Figures

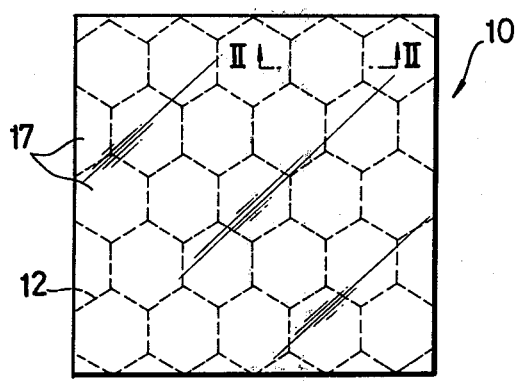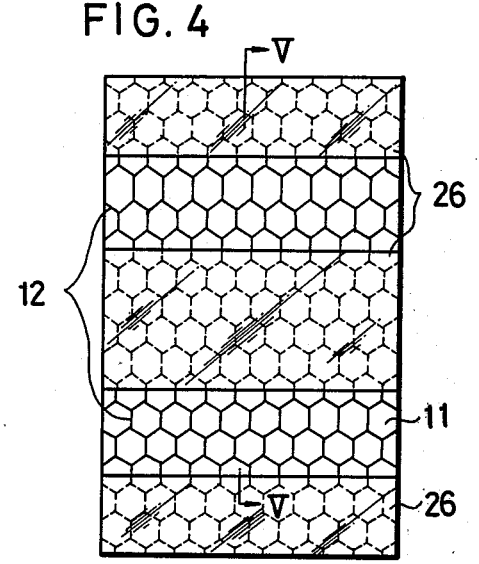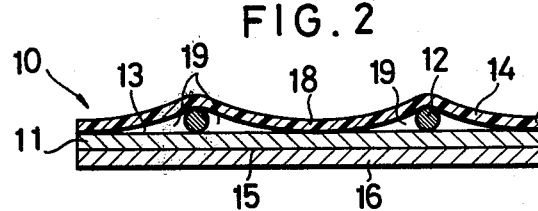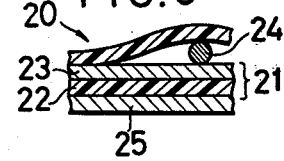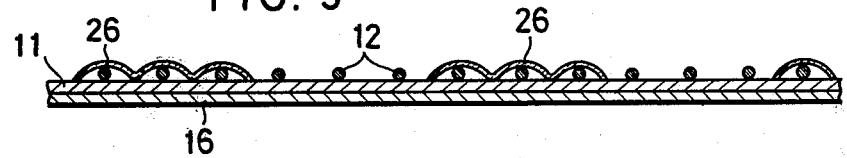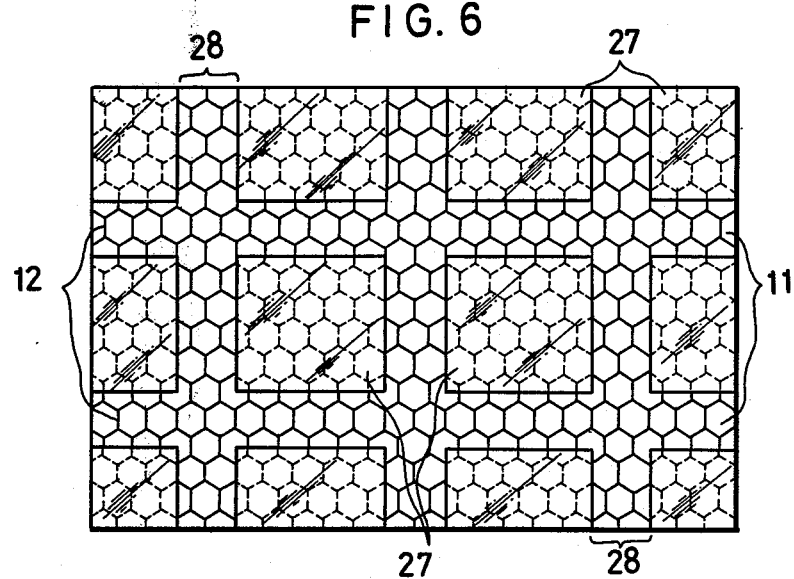

LAMINATED THERMAL INSULATION SHEETING

BACKGROUND OF THE INVENTION

1. Field of the Invention

The present invention relates to a laminated thermal insulation sheeting.

2. Prior Art

For thermally insulating ducts and pipes in which a coolant or heating medium flows to air-condition buildings, it is common practice to wrap up the ducts and pipes with a thermal insulator such as glass wool or rock wool, cover them with aluminum foil backed with kraft paper, and then fasten a honeycomb metal network therearound to hold the thermal insulator and metal network in position.

Such procedure, however, it tedious and time-consuming, and is practically infeasible. Furthermore, the aluminum foil is exposed to ambient air and hence tends to become corroded, with the result that it will lose luster and its heat reflective characteristic will become poor in a relatively short period of time.

SUMMARY OF THE INVENTION

According to the present invention, a metal network is disposed on and over one surface of an aluminum sheet, and a substantially transparent film of synthetic resin is placed on the metal network, portions of the film being bonded to the one surface of the aluminum sheet through interstices in the metal network.

It is an object of the present invention to provide a laminated thermal insulation sheeting having an aluminum sheet which can retain a desired degree of heat reflectivity for an increased period of time.

Another object of the present invention is to provide a laminated thermal insulation sheeting having a relatively low coefficient of heat transmission.

The above and other objects and advantages will become apparent from the following description when taken in conjunction with the accompanying drawings illustrating, by way of example, some preferred embodiments of the invention.

BRIEF DESCRIPTION OF THE DRAWINGS

FIG. 1 is a top plan view of a laminated thermal insulation sheeting provided in accordance with the present invention;

FIG. 2 is an enlarged cross-sectional view taken along II—II of FIG. 1;

FIG. 3 is an enlarged cross-sectional view showing a modified laminated thermal insulation sheeting;

FIG. 4 is a top plan view of a laminated thermal insulation sheeting according to a modification;

FIG. 5 is an enlarged cross-sectional view taken along V—V of FIG. 4;

FIG. 6 is a top plan view showing another modification of a laminated thermal insulation sheeting;

DETAILED DESCRIPTION OF THE PREFERRED EMBODIMENTS

Figure 7:
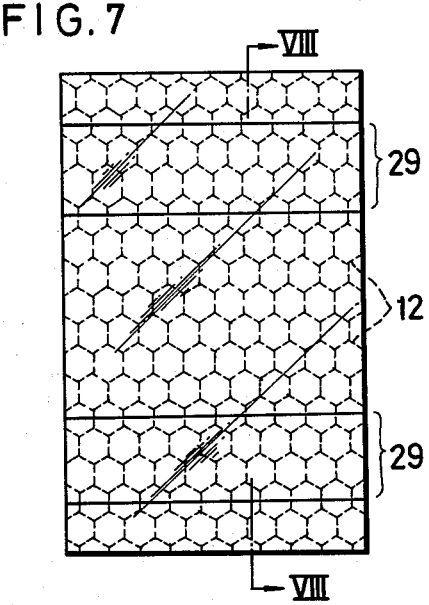
FIG. 7 is a top plan view of a laminated thermal insulation sheeting of still another modification.

As shown in FIGS. 1 and 2, a laminated thermal insulation sheeting 10 comprises an aluminum sheet 11, a network 12 made up of suitable metal wires and disposed on and over a surface 13 of the aluminum sheet 11, and a substantially transparent film 14 placed on the metal network 12.

The aluminum sheet 11 comprises aluminum foil and is preferably backed or lined on its other surface 15 with a backing material 16 such as kraft paper, a textile fabric, a film of synthetic resin such as olefin or vinyl chloride, or layer of polyether or polyester foam, so as to reinforce the aluminum foil 11 and increase its degree of heat insulation. The metal network 12 has honeycomb interstices or open spaces 17 between adjacent wires (FIG. 1) and acts as a core member of the sheeting 10. The metal network 12 makes the overall sheeting 10 relatively semirigid so that the sheeting 10 can retain its configuration once put around the profiles of the ducts and pipes to the thermally insulated.

The film 14 is made of suitable synthetic resin such as polyethylene, polypropylene, or ionomer, the thickness of the film 14 being in the range of from about 20 to about 50 microns. The film 14 has portions 18 bonded with or without adhesive to the surface 14 of the aluminum sheet 11 through the interstices 17. It is preferable to utilize an extruder for applying the film 14 to the aluminum sheet 11 under pressure.

In FIG. 2, the bonded portions 18 of the film 14 are spaced away from the wires of the metal network 12, thereby leaving air spaces 19 around the wires to give the sheeting 10 a low coefficient of heat insulation and to provide the wires with clearances in which they are displaceable to facilitate their bending and twisting when putting the thermal insulation sheeting 10 around the ducts and pipes.

As illustrated in FIG. 3, a modified laminated thermal insulation sheeting 20 includes an aluminum sheet 21 which comprises an aluminum-metallized film 22 of synthetic resin having an layer 23 of aluminum deposited thereon. A metal network 24 is placed on the aluminum layer 23 and the aluminum-metallized film 22 is lined with a backing material 25 on a surface remote from the aluminum layer 23.

The aluminum sheet 11,21 thus covered with the transparent film 14 can maintain its luster or brightness and hence its good heat reflectivity for a long period of time.

According to a modification shown in FIGS. 4 and 5, a plurality of substantially transparent film strips 26 of synthetic resin are placed on the metal network 12, the strips 26 being rectangular in shape and spaced from each other in side-by-side relation. FIG. 6 illustrates another modification in which a plurality of square film strips 27 are disposed on the metal network 12, each strip 27 being spaced from adjacent strips 27 so that portions 28 of the metal network 12 which are not covered with the film strips 27 are in the form of a grid or checkerboard pattern. With the modifications of FIGS. 4 and 5, and 6, an unobstructed access is gained to the metal network 12 where it is not covered with the film strips 26,27.

Figure 8:
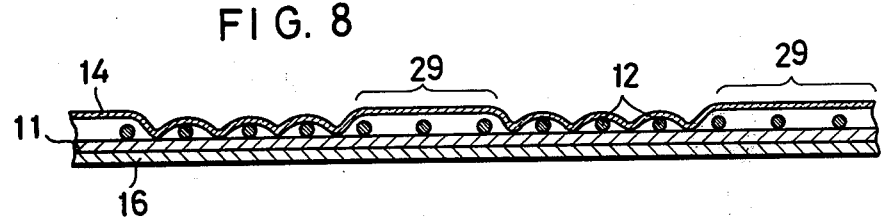
FIG. 8 are an enlarged cross-sectional view taken along line VIII—VIII of FIG. 7.
Figure 9:
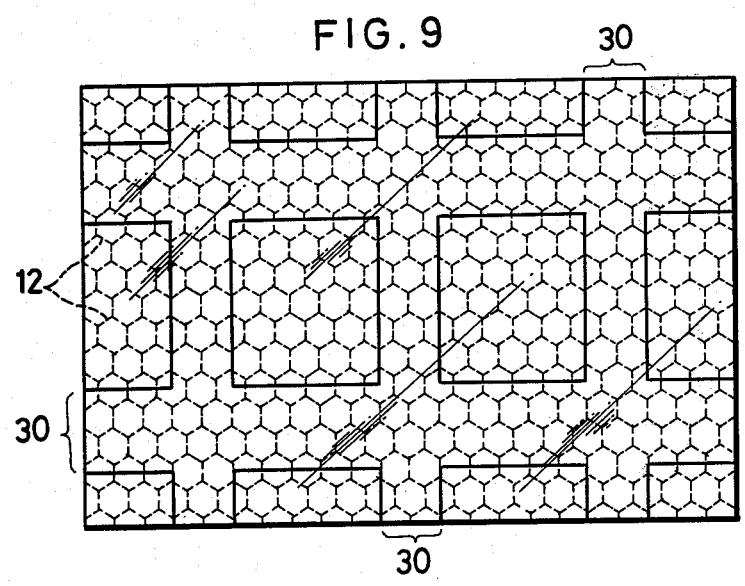
FIG. 9 is a top plan view illustrating a yet another modification of a laminated thermal insulation sheeting.

According to still another modification as shown in FIGS. 7 and 8, the substantially transparent film 14 covers the entire metal network 12, but there are portions 29 where the film 14 is not bonded to the aluminum sheet 11. The non-bonded portions 29 are rectangular in shape and are spaced from each other in side-by-side relation. In FIG. 9, non-bonded portions 30 of the film 14 are arranged in a grid or checkerboard pattern. Thus, bonded portions of the film 14 are confined to spaced square areas wherein the bonded portions are disposed adjacent to each other. The modifications illustrated in and 9 are advantageous in that the metal network 12 is entirely covered with the film 14, but can be taken out easily by tearing the non-bonded film portions 29,30 before its wires are twisted together or around nails or other retainers on the ducts, pipes, and building walls.

Although the present invention has been shown and described in connection with its preferred embodiments, it should be understood that various changes and modifications may be made without departing from the scope of the appended claims.

We claim as our invention:

1. A laminated thermal insulation sheeting, comprising:
   (a) an aluminum sheet;
   (b) a metal wire network disposed on and over one surface of said aluminum sheet and having interstices therein; and
   (c) a substantially transparent film of synthetic resin placed on said metal wire network and having portions bonded to said one surface of the aluminum sheet through said interstices in the metal wire network.

2. A laminated thermal insulation sheeting according to claim 1, said aluminum sheet comprising aluminum foil.

3. A laminated thermal insulation sheeting according to claim 2, including a backing sheet bonded to the other surface of said aluminum foil.

4. A laminated thermal insulation sheeting according to claim 1, said aluminum sheet comprising an aluminum-metallized film of synthetic resin, and said portions being bonded to a layer of aluminum deposited.

5. A laminated thermal insulation sheeting according to claim 4, including a backing sheet bonded to a surface of said aluminum-metallized film which is remote from the layer of aluminum.

6. A laminated thermal insulation sheeting according toclaim 1, said portions being spaced away from the wires of said metal wire network, thereby leaving air spaces around said wires.

7. A laminated thermal insulation sheeting according to claim 1, said film comprising a plurality of strips spaced away from each other.

8. A laminated thermal insulation sheeting according to claim 1, said portions being confined to spaced areas wherein the portions are disposed adjacent to each other.

* * * * *